Sept. 26, 1944. E. VOLET 2,358,894
ACCELERO-TACHOMETRIC REGULATOR
Filed Feb. 24, 1943 4 Sheets-Sheet 2

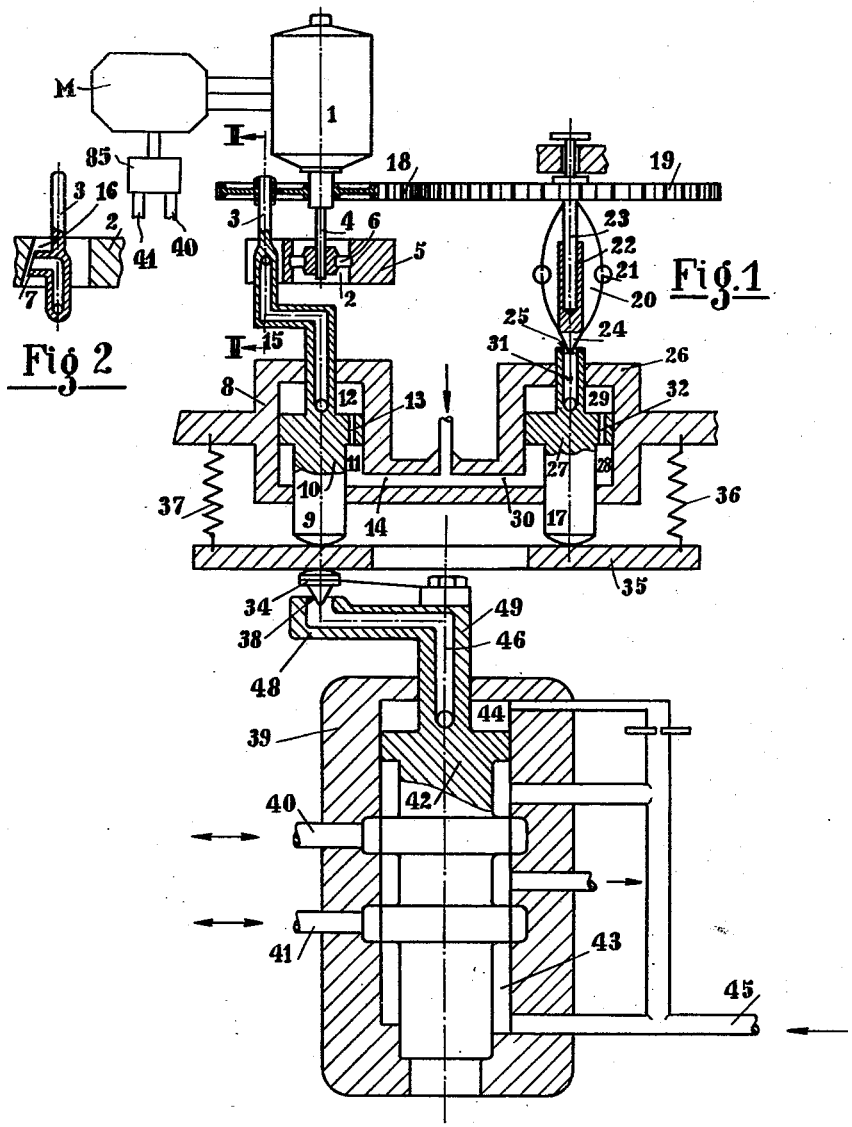

INVENTOR
EDOUARD VOLET,
BY Wolhaupter & Groff
ATTORNEYS

Sept. 26, 1944.　　　　E. VOLET　　　　2,358,894

ACCELERO-TACHOMETRIC REGULATOR

Filed Feb. 24, 1943　　　4 Sheets-Sheet 3

INVENTOR
EDOUARD VOLET,
BY Wolhaupter & Groff
ATTORNEYS

Patented Sept. 26, 1944

2,358,894

UNITED STATES PATENT OFFICE 2,358,894

ACCELERO-TACHOMETRIC REGULATOR

Edouard Volet, Vevey, Switzerland

Application February 24, 1943, Serial No. 476,985
In Switzerland January 24, 1942

14 Claims. (Cl. 264—6)

Several types of regulators enabling the speed of a machine to be stabilized to a constant value are already known. A primary category of such regulators comprises tachometric regulators which only measure the machine speed but do not permit said speed to be adjusted to a well defined constant value except with the aid of extraneous stabilizing members which must be added to the tachometer, said members having the disadvantage that while enabling the machine speed to be always set to a constant value, they lessen the sensitiveness of the tachometer and consequently the accuracy of adjustment. A second category of the aforesaid regulators comprises accelero-tachometric regulators, i. e. those wherein the action of the tachometer is trued up by the action of an accelerometer.

Some regulators belonging to said second category comprise a tachometer and an accelerometer united into a single assembly, the latter being usually constituted by a receptacle containing a fluid subjected simultaneously to the effects of acceleration and centrifugal force. One disadvantage of regulators comprising only one measuring element is that they are very difficult to truly set and to adapt to proper operating conditions. This is due to the fact that there is no possibility of varying the action of acceleration on the machine-adjusting members, independently of the action of centrifugal force, in order to secure in each and every particular instance a quick and stable adjustment of the machine speed.

Other regulators of known types comprise a tachometer and an accelerometer provided independently of each other and enabling the machine speed to be reliably adjusted to a constant and determined value. However, such known regulators involve difficulties when setting them to proper adjustment and often require a delicate change or adjustment of the measuring members particularly for being adapted to desired operating conditions. This delicate work should be effected in situ when starting the device. Consequently such known regulators call for skilled labor who must often spend a considerable time in scrutinizing the appliance before finding out the proper shape to be given to operating members thereof for ensuring the required running conditions of the machine. This entails a lengthy and costly work. Moreover, such known regulators are so built that the resumption of the machine speed at normal load value is generally far too sluggish. This involves a further disadvantage since for economical operation the duration of disturbed running should always be as short as possible and the machine speed should always be brought back swiftly to its normal load running value.

An object of the present invention is to provide a novel or improved accelero-tachometric regulator comprising a speed-measuring element and an acceleration-measuring element and capable of obviating the aforesaid disadvantages and enabling the transmission ratio of the displacements of at least one measuring element with relation to the actuator for the adjuster of the machine to be so selected and set as to cause the machine speed to resume its normal value with the utmost rapidity while the initial setting of the measuring elements is preserved.

Another object of the invention is to provide an accelero-tachometric regulator as aforesaid incorporating means enabling the ratio of transmission of the displacements of at least one measuring element with relation to the actuator for the adjuster of the machine to be selected and held steady while said machine is running.

Yet another object of the invention is to provide a hydraulically operating accelero-tachometric regulator as aforesaid wherein adjustment of the degree of servo-relationship of the adjusting means to either of the measuring elements can be progressively modified while the machine is running by a mere setting of the relative position of a port controlling a flow of fluid to a distributor operatively connected to an adjuster, e. g. a servo-motor for the machine to be regulated.

A further object of the invention is to provide an accelero-tachometric regulator as aforesaid wherein the flow of fluid through the port is adjusted by a needle valve on spring-urged intermediate means subjected to the action of plungers incorporated with the accelerometer and tachometer structures respectively.

A still further object of the invention is to provide an accelero-tachometric regulator as aforesaid wherein the distributor functions hydrostatically and embodies means for controlling the inflow of a fluid to pipes serving servo-motors associated with the adjuster for the machine which requires to be regulated.

With these and such other objects in view as will incidentally appear hereafter, the invention comprises the novel construction, combination and arrangement of parts that will now be described in detail with the reference to the accompanying diagrammatic drawings illustrating several embodiments of the same and forming a part of the present disclosure.

In the drawings:

Figure 1 is an elevation with parts in section showing a constructional form of my improved regulator wherein the accelerometer and the tachometer are arranged on different axes.

Figure 2 is a fragmentary sectional view on the line II—II of Fig. 1.

Figure 3:
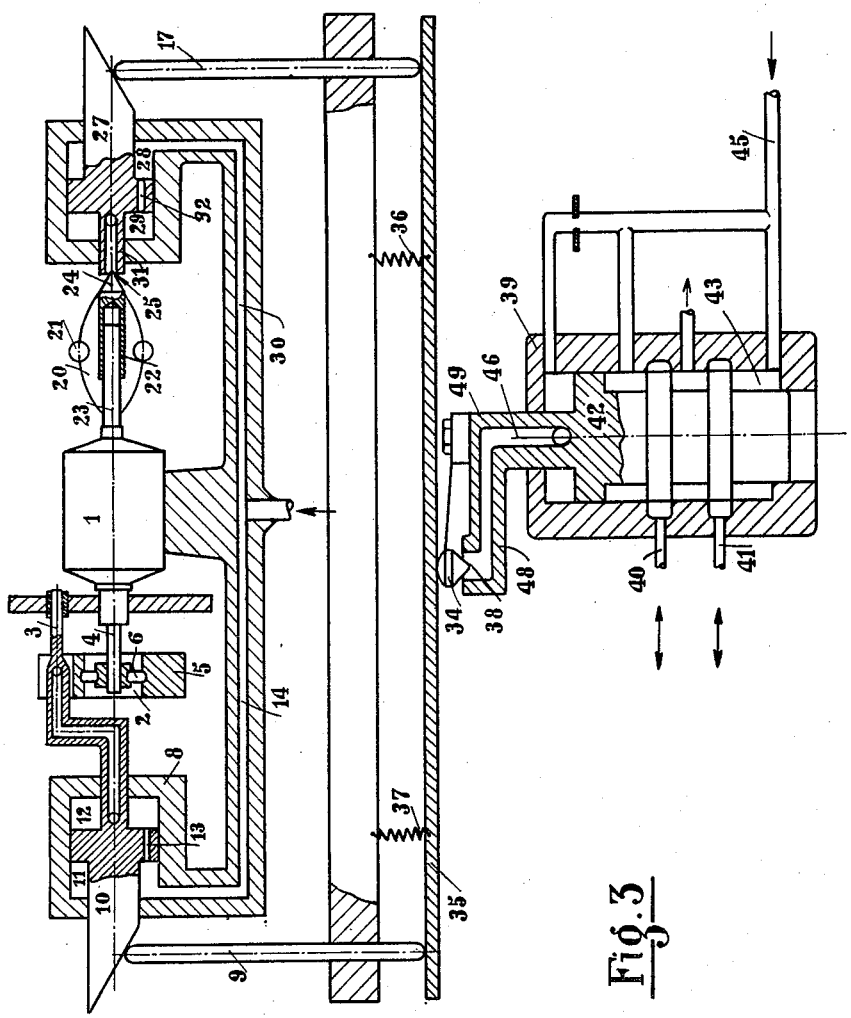
Figure 3 is a modification of this constructional form of Fig. 1 wherein the accelerometer and the tachometer are arranged on the same axis.

In the showing of Fig. 1, a synchronous motor 1 fed by the machine M which requires to be regulated revolves at a speed which is exactly equal to the machine speed and which truly follows up all its speed variations. The motor 1 drives a sensitive accelerometer 2.

The accelerometer 2 is shown diagrammatically because it forms as such no part of the invention and any suitable form of known accelerometer can be used. As is known by any one skilled in the art, accelerometers are generally made up of two parts which normally revolve at the same speed, one of said parts designated by 3 being axially but not angularly shiftable with respect to its driving shaft 4 and accordingly following up all speed variations of said shaft, while the other part 5 of the accelerometer which has a large mass is elastically mounted by means of spring blades 6 on its driving shaft 4, so that at each speed variation of said shaft, an angular lag ensues between the part 3 and the mass 5. Therefore any acceleration causes an angular lag between the two parts of the accelerometer, said lag being proportional to the acceleration value.

In the exemplified construction shown in the drawings, the angular displacements of the parts of the accelerometer control the rate of flow through the outlet 7 of a hydraulic relay 8 comprising a longitudinally movable plunger 9 whose position as well as the position of the outlet 7 is caused by known or conventional means to vary in terms of the acceleration.

The hydraulic relay 8 may comprise for example, as shown in the drawings, a cylinder in which is slidably housed a piston 10 separating from each other two chambers 11, 12, the volumes of which thus vary in response to the motions of said piston 10, said chambers receiving liquid through a pipe 14 and being interconnected by a narrow aperture 13 in the piston 10. Another pipe 15 connects the chamber 12 to the outlet port 7. As the surfaces of the piston 10 which define the chambers 11, 12 are of different size, it will be seen that each variation of the rate of flow through the outlet port 7 (Fig. 2) responsive to an acceleration in the operation of the regulatable machine moves the piston 10 in the one or the other direction. Opening of the outlet port 7 is rendered variable by the movement of a partition 16 (Fig. 2) which slants with respect to the direction in which said port moves. To each value of the acceleration corresponds a well defined position of the partition 16 and consequently of the piston 10. This piston 10 controls the motions of the plunger 9 connected thereto and of the outlet port 7.

The motor 1 drives through a train of gears 18, 19, a sensitive tachometer 20. The construction of this tachometer is known and comprises masses as balls 21 driving a sleeve 22 slidably mounted on the driving shaft 23 for the tachometer which also comprises a needle valve 24 controlling the rate of liquid flow through the outlet port 25 of a hydraulic relay 26. This relay is provided with a longitudinally movable plunger 17 whose position as well as the position of the port 25 are arranged by known means to respond to the speed of revolution of the shaft 23.

The hydraulic relay 26 is preferably of the same type as the relay 8 and comprises for example, as shown in the drawings, a cylinder fitted with a piston 27 defining a pair of chambers 28, 29 having volumes which vary in response to said piston motions. One of such chambers (28) receives liquid through a pipe 30 while the other chamber 29 is connected to the outlet port 25 by a duct 31. The chambers 28, 29 intercommunicate through a narrow aperture 32.

It will be seen from the foregoing that any variation in the rate of the liquid flow through the port 25 due to a speed variation shifts the piston 27, therefore tending to resume normal liquid flow through the port 25. Consequently to each value of the speed of the machine M which requires to be regulated, there corresponds a well defined position of the needle valve 24 and therefore a balanced position of the piston 27. The motions of the piston 27 control the displacements of the plunger 17 as well as those of the port 25.

Accordingly the rate of liquid flow through the port 25 brings about either a balanced condition or a movement of the piston 27 which truly follows up all motions of the sleeve 22. The position of the plunger 17 corresponds with the absolute value of the speed throughout the duration of the regulation being performed and between the widely separated operative limits of the tachometer.

Both plungers 9 and 17 operate on an intermediate ring member 35 held by springs 36, 37, whose motions are controlled thereby. The intermediate ring member 35 controls in turn the motions of a needle valve 34 which opens or closes the outlet port 38 of a distributor 39 whose motions are determined by the rate of liquid flow through the port 38. The distributor 39 controls the opening or closing motions of the adjuster for the machine M to be regulated through the medium for example of servo-motors which are hydraulically operated through pipes 40, 41.

The distributor 39 belongs to a known type and may comprise for example, as shown in the drawings, a cylinder fitted with a piston 42 defining a pair of chambers 43, 44 having varying volumes and receiving liquid through an intake pipe 45. The chamber 44 is connected to the port 38 through a channel 46. The rate of liquid flow through the port 38 brings about either balancing conditions or motions of the piston 42 which in turn opens or closes the pipes 40, 41.

The port 38 is formed on the one end of an arm 48 pivotally carried by a pin 49 centered with respect to the ring member 35. As both plungers 9, 17, are situated on one and the same diameter of the ring member 35, it will be easily understood that by swinging the arm 48, the possibility is afforded of progressively varying the transmission ratios of the motions of the plungers 9, 17 to the distributor 39. As a matter of fact, if the port 38 is situated underneath the point of engagement of the plunger 9 controlled as aforesaid by the accelerometer 2, only the motions of this plunger are transmitted to the distributor 39. On the contrary, if the port 38 is situated underneath the plunger 17 controlled by the tachometer 20, only the motions of this plunger are transmitted to the distributor 39. To all the intermediate positions of the port 38 on the ring member 35 correspond all the transmission ratios comprised between 0 and 1.

It will be observed that owing to the provision of the regulator according to the invention, the action of each measuring element on the adjuster for the machine to be regulated can be accurately set, i. e. the transmission ratios of the motions of the plungers 9, 17 to the distributor 39 may be so selected as to cause either of the measuring elements to have a preponderating action without any necessity of varying or changing any part of the measuring elements 2, 20, by a mere adjustment of the angular setting of the arm carrying the port 38 on the ring member 35 with respect to both plungers 9, 17 arranged on one and the same diameter.

It will be seen from the foregoing that the adjustment of the degree of servo-relationship of the regulating members to the two respective measuring elements can be progressively varied during the operation of the machine by a mere adjustment of the angular setting of the port 38. It follows that the adjustment of an accelero-tachometric regulator which heretofore has always been considered as a long and delicate job no longer presents any difficulty and can be carried out very easily and very quickly. Moreover, since the degree of servo-relationship to the one and the other of the measuring elements can be selected at will, it becomes possible to cause the tachometer to operate throughout the duration of the disturbed running conditions and consequently to bring about a much quicker resumption of the speed to normal load running conditions.

Actually accelero-tachometric regulators comprising an accelerometer and a tachometer independent from each other as are at present known, do not permit the degree of servo-relationship to the one and the other of the respective measuring elements to be selectively varied. In order to prevent the machine M which must be regulated from hunting, a slow return of the speed to its normal load running conditions should be chosen. Actually owing to the regulator according to the invention the action of the tachometer is perceptible throughout the duration of said return. This makes it possible, by selecting a very wide zone of action of the hydraulic relay 26, to minimize the slowing down action of the accelerometer upon the return of the speed to its normal load running conditions.

Figure 5:
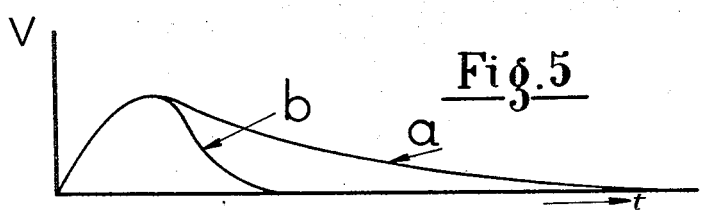
Figure 5 is a diagrammatic view showing typical regulation curves laid down from the results derived from the operation of known regulators and of a regulator according to my present invention respectively.

The diagrammatic showing of Fig. 5 illustrates by way of example a regulation curve a obtained when using known regulators and the regulation curve b obtained when using the improved regulator according to the present invention. It will be seen from said curve that the duration of the perturbed or disturbed running conditions is much shorter in the second case than in the first case. This presents great advantages in actual running conditions of the machine especially when the disturbance is due to a sudden overload the correction of which is always more difficult to achieve than underloads.

It is obvious that the ring member 35 may be replaced by a bar by providing the outlet port 38 of the distributor 39 on a slide arranged parallel to said bar so as to permit the leverage between the plunger 9 and the port 38 on the one hand, and the port 38 and plunger 17 on the other hand, to be varied. Alternatively the intermediate ring member 35 may be secured to the plungers by means of knuckle or like joints whereby said member could assume a very steep inclination.

A relative displacement may be also provided between the distributor 39 and the intermediate member 35 with the assembly of the measuring elements.

Obviously it is not necessary for the pin 49 on which the arm 48 pivots to be centered with respect to the ring member 35. Said pin may be made eccentric in such manner as to call for smaller angular displacements with a view to varying to the same extent the transmission ratio of the motions of both plungers to the distributor.

It is also possible to drive each measuring element by a distinct motor, each motor being fed by the machine to be regulated and strictly in accordance with the variations of its speed. The advantage of arranging for each measuring element to be actuated by a separate shaft resides in a general flexibility of the assembly. Owing to this arrangement, it becomes possible to cause the accelerometer and the tachometer to revolve at the most favorable speeds.

The showing of Fig. 3 illustrates a regulator similar to the one shown in Fig. 1 but wherein both measuring elements are mounted on one and the same shaft. Like parts are designated by like reference numerals in both figures.

As the radius of the circle wiped by the arm 48 which carries the outlet port 38 of the distributor 39 is selected to a smaller value than that of the circle on which the plungers 9, 17 are arranged, the ratios of transmission of the motions of said plungers to the distributor 39 cannot be varied from 0 to 1 as in the previous case but solely between two well defined limits whose values may be widely different for each of the two plungers, where the pivotal axis 49 for the arm 48 is not at equal distances from the plungers 9, 17.

Figure 4:
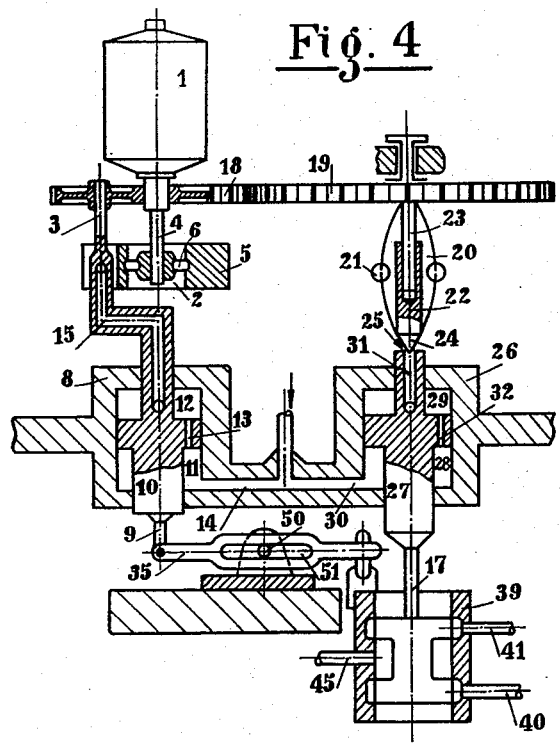
Figure 4 is an elevation with parts in section showing a further modified constructional form.

The regulator shown in Fig. 4 comprises a direct connection between the plunger 17 actuated by the tachometer 20 and the piston 42 of the distributor 39 so that the ratio of transmission of the displacements of the tachometer to said distributor cannot be modified afterwards.

An intermediate member 35 constituted by a lever is connected to the plunger 9 actuated by the accelerometer and to a sleeve on the distributor 39. Said intermediate member is pivotally carried by a pin 50 which is slidably housed in a slot 51 formed in said member so as to enable the length of the lever arms to be varied and the ratio of transmission of the displacements of the accelerometer to the distributor to be also varied to suit the desired running conditions of the machine.

Likewise the displacements of the tachometer may be so transmitted to the distributor sleeve valve by an adjustable lever as to provide a means of independently varying the transmission ratios of the tachometer and accelerometer.

Figure 6:
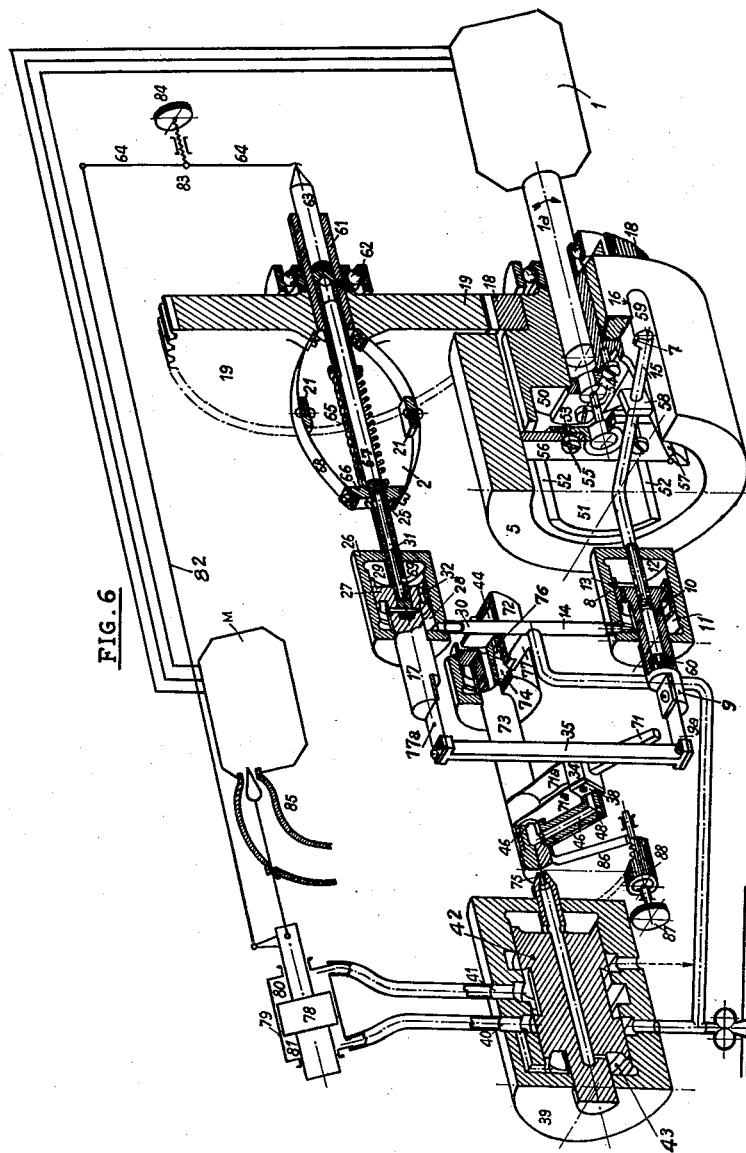
Figure 6 is a perspective view with parts in section of a still further constructional form of the regulator.

In the constructional form illustrated in Fig. 6, the motor 1 revolves a shaft 1a to one end of which is rigidly secured a toothed wheel 18 through the medium of a bushing 50. Said bushing is provided with a cylindrical extension 51 having a pair of longitudinal slots 52 extending parallel to its longitudinal axis and a slot 57 extending obliquely to said axis. The bushing 50 has also rigidly fixed thereto a disk 53 into which one end of a shaft 54 is shrunk in. Said shaft 54 has rigidly secured to its opposite end a plate 55 secured to a yoke member 56 engaged through the slots 52 and formed integral with the mass 5. The slot 57 forms a guide for a slider 58 integrally connected to the pipe 15 whose end has the outlet port 7 engaged through an opening 59 formed in the mass 5 and extending parallel to its axis of revolution. It will be observed that a sliding motion of the slider 58 through the slot 57 moves the port 7 toward or away from the wall 16 of the opening 59.

The shaft 54 has a reduced diameter and is made of a material having a high mechanical resistance and a great resiliency, whereby whenever the shaft 1a undergoes a speed variation, the inertia of the mass 5 elastically twists the shaft 54 and consequently moves the mass 5 angularly with respect to the bushing 50, thereby exposing the port 7 and consequently altering the rate of flow through said port and the pressure prevailing inside the pipe 15. Such an angular displacement is a linear function of the acceleration.

The relay 8 of Fig. 6 is similar to the one described with reference to Figs. 1 to 4. However, the end of the pipe 15 is revolubly carried in a bearing 60 fitted into the piston 10. The pipe 15 follows up all longitudinal displacements of the piston 10 as controlled by the variations in the rate of fluid flow through the port 7 under the action of angular displacements which take place between the mass 5 and shaft 1a. The longitudinal displacements of the piston 10 cause the slider 58 to move through the guiding slot 57 whose inclination is so oriented as to bring the liquid flow through the port 7 back to its initial value.

In Fig. 6, the tachometer 2 is revolved by the toothed wheel 19 which meshes with the toothed wheel 18. Said wheel 19 is rigidly secured to a sleeve 61 pivotally carried in a roller bearing 62. Inside the sleeve 61 is slidably received a pin 63 one end of which is pointed and in contact with a rocking lever 64 which compresses a spring 65 abutted on a bush 66 in which is loosely mounted a pin 67 rigidly secured by one of its ends to the piston 27 and having its other end slidably received in an axial bore in the outwardly projecting pin 63. The bush 66 has carried thereon spring blades 68 having one of their ends fixed thereto and each carrying a riveted mass 21. The other end of each spring blade 68 is rigidly secured to the toothed wheel 19. It will be seen from this arrangement that the centrifugal force which urges the masses 21 exerts a tightening tendency on the spring blades 68, thereby sliding the bush 66 along the pin 67 and compressing the spring 65. The pin 67 has an axial bore 31 which communicates with the chamber 29 through a bore 69 and with the outer atmosphere through an outlet port 25 whose location coincides with the bush 66.

Therefore should the speed of revolution of the tachometer increase, the bush 66 more widely exposes the outlet port 25. When increasing, the rate of flow through this port breaks the balance between the pushing stresses exerting themselves on the piston 27 of the hydraulic relay 26. Consequently the piston 27 is axially shifted until the initial rate of flow and the balance between said pushing stresses are restored.

In Fig. 6, the free ends of the plungers 9, 17 have rigidly secured thereto in the axial direction by means of spring blades 9a and 17a the intermediate member or bar 35. These blades permit a relative displacement between the plungers. The bar 35 has abutted thereto a finger 71 resiliently mounted on the rod of a piston 73 owing to a pair of spring blades 71a. Said finger carries the needle valve 34 which controls the opening and the closing of the outlet port 38. This port communicates through a duct 46 with a chamber 44 in the hydraulic relay 72. This relay is similar to the relays 8, 26 and comprises a movable piston 73 which defines a pair of chambers 44, 74, whose volumes vary when said piston moves. Said chambers intercommunicate through an accurately gaged duct 76, the chamber 74 receiving liquid through a pipe 77.

It clearly follows from the foregoing that a displacement of anyone of the plungers 9, 17 shifts the bar 35 and consequently the finger 71 (Fig. 6). The latter varies the rate of flow through the port 38, thereby breaking the balance between the pushing stresses exerting themselves on the faces of the piston 73. When being shifted, this piston moves the arm 48 connected thereto. As soon as the normal rate of liquid flow through the port 38 is resumed due to the attainment of balancing conditions between the pushing stresses, the piston is held motionless. Displacement of the piston 73 furthermore controls the opening and the closing of an outlet port 75 on the hydraulic distributor 39. The motions of the sleeve valve 42 of this distributor as controlled by the variations in the rate of fluid flow through the port 75 bring about motions of a servo-motor whose piston 78 slidably received in a cylinder 79 and defining a pair of varying volume chambers 80, 81, causes their volumes to vary responsive to said motions. The position of the piston 78 defines the position of a duct member 85 which controls the intake of motive fluid to the machine which is to be regulated, for example the water intake to a turbine as shown in the drawings.

In Fig. 6, a rod or link 82 operatively connects the piston 78 to the lever 64. This lever is hingedly carried on a stationary point 83. The position of the point 83 can be regulated by means of a manually operable member 84 which permits the normal load speed of the machine M to be varied by altering the axial position of the pin 63 and consequently the tension of the spring 65 for one and the same position of the bush 66. Owing to a similar action, the link 82 makes it possible to lay down a well defined law between the position of the piston 78 and normal load speed of the machine.

The degree of servo-relationship of the distributor 39 to the tachometer and the accelerometer or in other words the ratios of transmission of the motions of each of the plungers 9, 17, may be selectively chosen and adjusted by varying the position of the finger 71 on the bar 35. For that purpose, a toothed wheel 86 is rigidly mounted upon the free end of the rod of the piston 73 and a manually operable member 87 integral with a pinion 88 meshing with said toothed wheel 86 enables the finger 71 to be slid along the bar 35.

Obviously the position of the finger 71 along the bar 35 may be adjusted by any known means.

Numerous minor constructional details may be varied without sacrificing the advantages of the device while not departing from the scope of the subjoined claims.

What is claimed is:

1. An acceleration responsive and speed responsive regulator for an adjuster on a machine to be regulated, said regulator comprising a displaceable speed-measuring element and a displaceable acceleration-measuring element constructed as separate units, an actuator for said adjuster, intermediate lever means between at least one of said elements and said actuator, and means for selecting and securing the leverage ratio of said intermediate means while securing quick restoration of the machine speed to normal load running conditions without disturbing the setting of said elements.

2. An acceleration responsive and speed responsive regulator for an adjuster on a machine to be regulated, said regulator comprising a displaceable speed-measuring element and a displaceable acceleration-measuring element constructed as separate units, a distributor for actuating said adjuster, said distributor including two slidably related interfitting parts, and means so interconnecting said elements to one of said parts as to vary the relative positions of said parts responsive to the respective positions of both elements.

3. An acceleration responsive and speed responsive regulator for an adjuster on a machine to be regulated, said regulator comprising a displaceable speed-measuring element and a displaceable acceleration-measuring element constructed as separate units, a distributor for actuating said adjuster, said distributor including two slidably interfitting parts respectively connected to said elements, at least one of the connections between one element and one of said parts including a lever having a shiftable pivotal fulcrum, thereby enabling ready variation of the value of displacement of one of said parts responsive to a given displacement of the associated element.

4. An acceleration responsive and speed responsive regulator for an adjuster on a machine to be regulated, said regulator comprising a displaceable speed-measuring element and a displaceable acceleration-measuring element, said elements including plungers and being constructed as separate units, an actuator for said adjuster, an intermediate member between said plungers and actuator, the plungers acting substantially at right angles and at spaced points upon said intermediate member, and means for shifting along the intermediate member its operational connection with the actuator, thereby varying the operative leverage.

5. An acceleration responsive and speed responsive regulator for an adjuster on a machine to be regulated, said regulator comprising a displaceable speed-measuring element and a displaceable acceleration-measuring element, said elements including plungers and being constructed as separate units, a distributor for actuating said adjuster, an intermediate member between said plungers and distributor, a slide for guiding the distributor in substantial parallelism to said intermediate member, and means for shifting along the intermediate member its operational connection with the distributor, thereby varying the operative leverage.

6. An acceleration responsive and speed responsive regulator for an adjuster on a machine to be regulated, said regulator comprising a displaceable speed-measuring element and a displaceable acceleration-measuring element, said elements including plungers and being constructed as separate units, a distributor for actuating said adjuster, an intermediate plane member interposed between said plungers and distributor and substantially at right angles to the plungers, and means for shifting along said intermediate member the points of pushing engagement of the plungers therewith, the location of the operational engagement between the distributor and intermediate member being well defined.

7. An acceleration responsive and speed responsive regulator for an adjuster on a machine to be regulated, said regulator comprising a displaceable speed-measuring element and a displaceable acceleration-measuring element constructed as separate units, a hydrostatic distributor operatively connected to the machine adjuster, and an intermediate member interposed between said elements and distributor and so acted upon by said elements as to vary the operation of the distributor.

8. An acceleration responsive and speed responsive regulator for an adjuster on a machine to be regulated, said regulator comprising a displaceable speed-measuring element and a displaceable acceleration-measuring element constructed as separate units, a hydrostatic distributor operatively connected to the machine adjuster, and an intermediate plane member urged by said elements, an arm on said distributor mounted for activation by said plane member, said arm being pivotable about an axis substantially at right angles to the plane of said intermediate member.

9. An acceleration responsive and speed responsive regulator for an adjuster on a machine to be regulated, said regulator comprising a displaceable speed-measuring element and a displaceable acceleration-measuring element constructed as separate units, a hydrostatic distributor operatively connected to the machine adjuster, and an intermediate plane member urged at spaced engagement points by said elements, an arm on said distributor mounted for actuation by said plane member, said arm being pivotable about an axis substantially at right angles to the plane of said intermediate member and substantially equidistant to said engagement points.

10. An acceleration responsive and speed responsive regulator for an adjuster on a machine to be regulated, said regulator comprising a displaceable speed-measuring element and a displaceable acceleration-measuring element constructed as separate units, each said element being driven by a separate shaft and so mounted that the speeds of revolution of said shafts are proportional to that of the machine, each shaft being actuated by an electric motor fed by said machine and truly following up the speed variations of said motor an actuator for said adjuster, means for transmitting the displacements of said elements to said actuator, and setting means for selecting and maintaining the ratio of transmission of the displacements of at least one of said elements to said actuator.

11. An acceleration responsive and speed responsive regulator for an adjuster on a machine to be regulated, said regulator comprising a displaceable speed-measuring element and a displaceable acceleration-measuring element constructed as separate units, each said element being driven by a separate shaft and so mounted that the speeds of revolution of these shafts are proportional to that of the machine, both shafts being actuated by an electric motor energized by said machine and truly following up the speed variations of said motor an actuator for said adjuster, means for transmitting the displacements of said elements to said actuator, and setting means for selecting and securing the ratio of transmission of the displacements of at least one of said elements to said actuator.

12. An acceleration responsive and speed responsive regulator for an adjuster on a machine to be regulated, said regulator comprising a displaceable speed-measuring element and a displaceable acceleration-measuring element constructed as separate units, said elements having mutually aligned axes of revolution and being carried by a common shaft whose speed of revolution is proportional to the speed of said machine, said shaft being actuated by an electric motor energized by current from a generator associated with said machine and truly following up the variations of the machine speed, an actuator for said adjuster, means for transmitting the displacements of said elements to said actuator, and setting means for selecting and maintaining the ratio of transmission of the displacements of at least one of said elements to said actuator.

13. An acceleration responsive and speed responsive regulator for an adjuster on a machine to be regulated, said regulator comprising a displaceable speed-measuring element and a displaceable acceleration-measuring element constructed as separate units, a pair of differential hydraulic relays each having an outlet port, valve means on said elements for controlling the respective ports, each relay including a cylinder and a piston slidable therein and defining therein a pair of chambers, an intermediate member urged by said pistons and interlinking them, an actuator for the machine adjuster, and an operative connection between said intermediate member and actuator.

14. An acceleration responsive and speed responsive regulator for an adjuster on a machine to be regulated, said regulator comprising a displaceable speed-measuring element and a displaceable acceleration-measuring element constructed as separate units, said last-named element comprising a mass, a first twistable shaft carrying said mass on a first end thereof, a second shaft mounted to rotatably drive said first shaft by the second end of said first shaft, said second shaft being so operatively linked to said machine as to truly follow up the speed variations of its power shaft, a pair of hydraulic relays each having an outlet port, valve means on the elements for controlling the respective ports, each relay including a cylinder and a piston slidable and defining therein a pair of chambers, an intermediate member urged by said pistons and interlinking them, an actuator for the machine adjuster, and an operative connection between said intermediate member and actuator.

EDOUARD VOLET.